United States Patent [19]

Honma

[11] Patent Number: 5,781,375
[45] Date of Patent: Jul. 14, 1998

[54] INFORMATION RECORDING DISK CHUCK MECHANISM

[75] Inventor: Kazuo Honma, Kanagawa-ken, Japan

[73] Assignee: Hitachi Electronics Engineering Co., Ltd., Tokyo, Japan

[21] Appl. No.: 831,742

[22] Filed: Apr. 1, 1997

[30] Foreign Application Priority Data

Apr. 3, 1996 [JP] Japan ................. 8-106364

[51] Int. Cl.$^6$ ................................. G11B 17/02
[52] U.S. Cl. ....................... 360/99.12; 369/271
[58] Field of Search ............... 360/99.05, 99.12; 369/261, 270, 271

[56] References Cited

U.S. PATENT DOCUMENTS 4,149,207  4/1979  Porter ................. 360/99.05
4,958,839  9/1990  Guzik ................. 360/99.12
5,014,143  5/1991  Mori ................... 360/99.12

Primary Examiner—A. J. Heinz
Attorney, Agent, or Firm—Fay, Sharpe, Beall, Fagan, Minnich & McKee

[57] ABSTRACT

A disk chuck mechanism of the present invention reliably chucks a disk on an upper end surface of a cylinder by providing a short rod penetrating the cylinder, coupling a circular plate and a plate member to opposite ends of the rod, providing a biasing member such as coil springs for biasing the rod in the direction in which the rod is moved away from the cylinder, pulling the rod down from the cylinder by biasing force of the biasing member to expand a ring member having a diameter smaller than an annular groove and to fit it in the annular groove, to thereby uniformly press a side surface of a center opening of the disk with an outer peripheral surface of the cylinder.

10 Claims, 5 Drawing Sheets

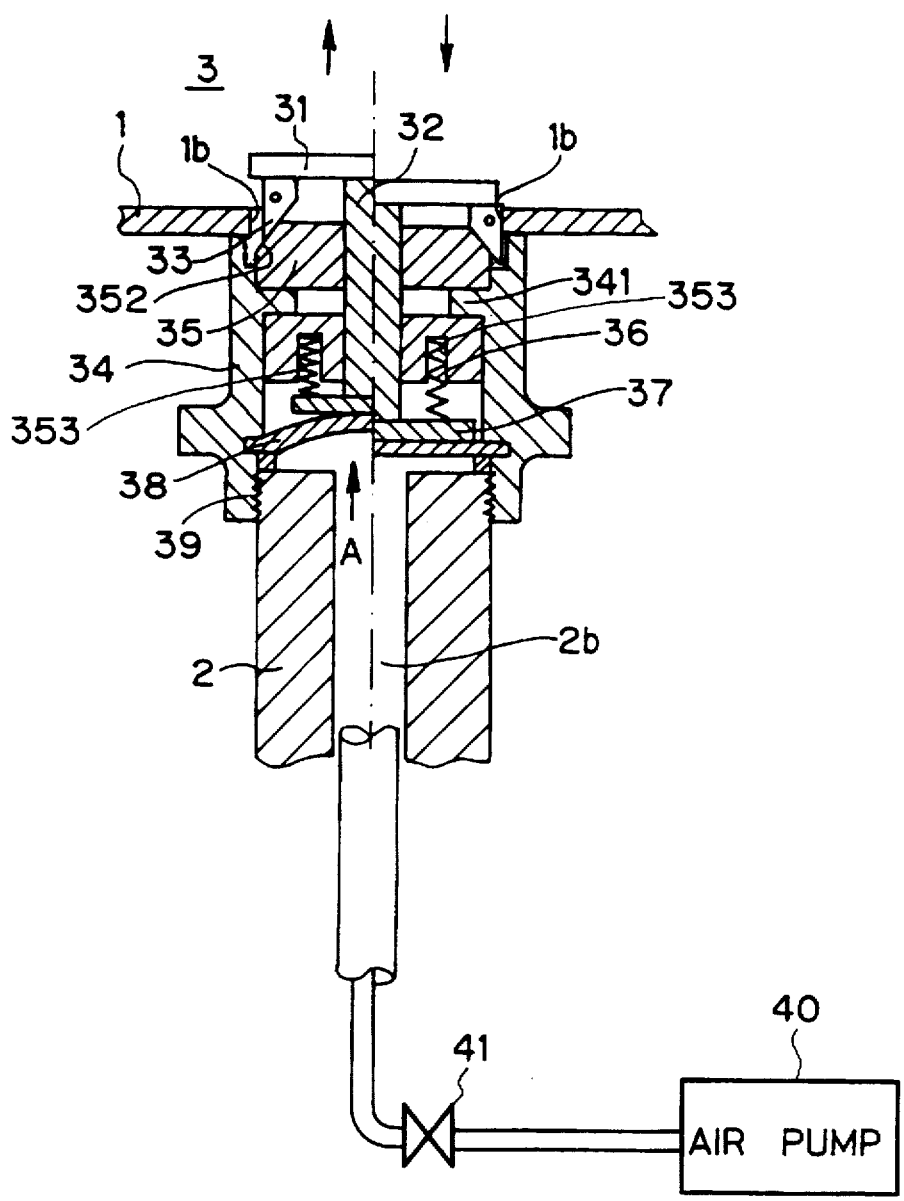

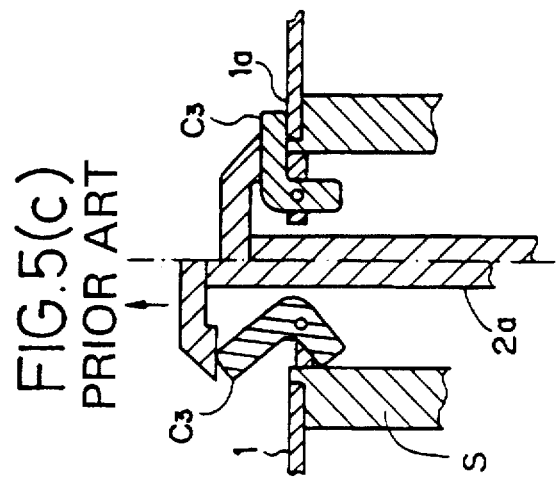
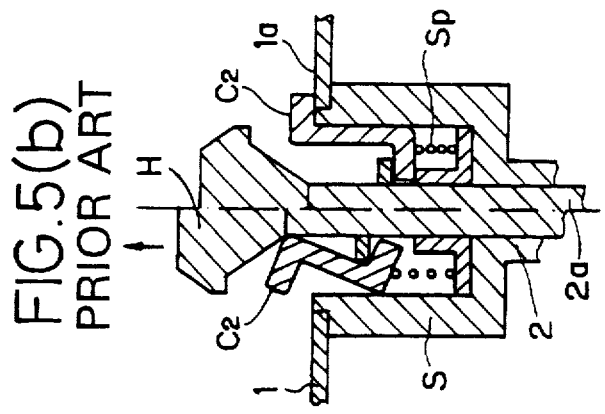
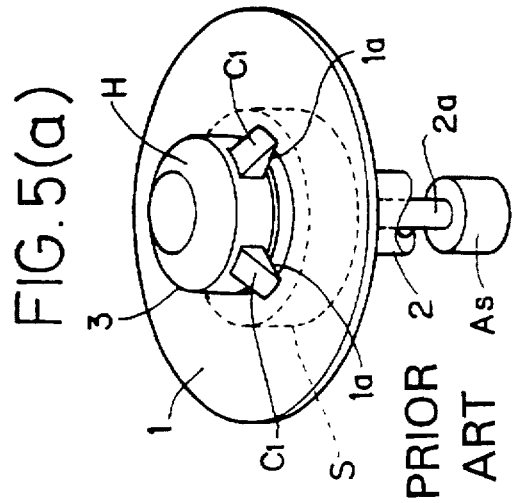
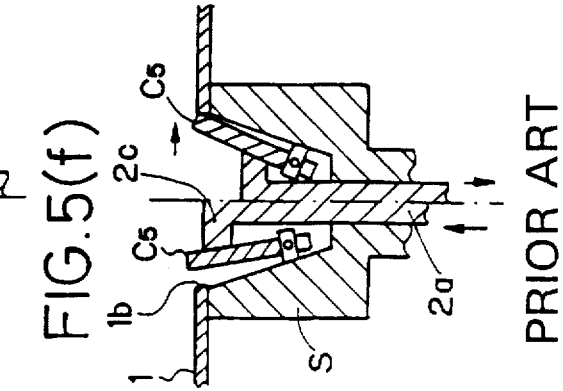
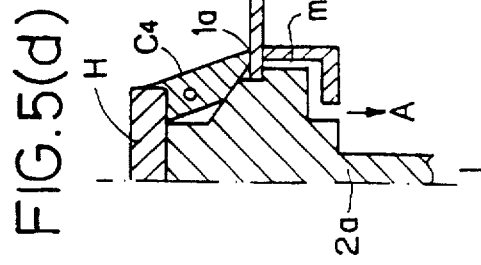

INFORMATION RECORDING DISK CHUCK MECHANISM

DESCRIPTION

1. Technical Field

The present invention relates to an information recording disk chuck mechanism and, particularly, to a compact disk chuck mechanism of a disk drive mechanism of a magnetic disk tester, which is suitable to chuck a disk having a small diameter and capable of stably chucking such disk even when it is rotated at high speed.

2. Background Art

A magnetic disk or an optical disk, etc., used to record an information is tested by a disk tester on its physical defect and electric recording performance. Such disk tester is usually with a spindle and a driving mechanism therefor and a disk to be tested is chucked by a chuck mechanism provided in a head portion of the spindle and rotated.

In a prior art disk tester, a disk was mounted on a chuck mechanism manually. However, along with a recent tendency of employment of automatic disk tester, a disk is automatically chucked nowadays by a robot hand and a disk chuck mechanism adaptable thereto.

FIG. 5 shows typical examples of the prior art disk chuck mechanism capable of automatically chuck a disk, in which FIG. 5(a) is a perspective view of an example of prior art disk chuck mechanisms and FIGS. 5(b) to 5(f) are cross sections of other prior art mechanisms. In each of FIGS. 5(b), 5(c) and 5(f), a left half shows the mechanism in releasing state and a right half shows the mechanism in a disk chucking state. FIG. 5(d) is a cross section of a right side half of a prior art mechanism in a disk chucking state. Some chuck mechanism of this type are disclosed in U.S. Pat. No. 5,014,143 issued to the same assignee as that of this application on May 7, 1991.

Referring to FIG. 5(a), the chuck mechanism is constituted with a head H having a plurality of chuck pawls or chuck members C1 provided periphery thereof, a cylinder S having a hollow spindle portion 2 extending from a lower surface of the cylinder S, a shaft 2a extending from a lower surface of the head H through the through-hole of the hollow spindle portion 2 and an air cylinder As coupled to a lower end portion of the shaft 2a.

When the shaft 2a is risen by the air cylinder As, the chuck pawls C1 are closed by an open-close mechanism composed of springs (not shown) provided in the head H and a slope surface of the cylinder S. In this state, a robot hand holding a disk 1 mounts the disk 1 on a disk holding surface of the cylinder S by fitting a center opening of the disk 1 on the head H. Then, when the shaft 2a is lowered by the air cylinder As, the chuck pawls C1 are opened and end portions of the chuck pawls C1 clamp a peripheral surface portion 1a of the center opening of the disk 1. Thus, the disk 1 is chucked by the chuck pawls C1 and the cylinder S.

In the structure shown in FIG. 5(a), it is difficult to reduce a diameter of the head H sufficiently due to existence of the open-close mechanism of the chuck pawls. This means that the structure shown in FIG. 5(a) is not suitable to chuck a small size disk and a manufacture thereof and a maintenance work therefor are not easy.

FIG. 5(b) shows a structure in which a lower portion of a head H is made conical and a plurality of chuck members C2 are arranged between the conical lower portion of the head H and a cylinder S. When a shaft 2a is risen, the chuck members C2 are inclined inward by a spring Sp as shown in a left side portion of FIG. 5(b). In this state, a disk 1 is mounted on a surface of the cylinder S by putting a center opening portion of the disk 1 through the head H. Then, when the shaft 2a is lowered, the conical surface of the lower portion of the head H pushes upper ends of the chuck members C2 outward, resulting in a state shown in a right side portion of FIG. 5(b). Thus, the disk 1 is chucked by the -chuck members C2 and the cylinder S as in the case of the structure shown in FIG. 5(a).

FIG. 5(c) shows a structure of the disk chuck mechanism in which a plurality of L shaped chuck members C3 are pivotally supported by pins implanted in an inner wall of a cylinder S. When a shaft 2a is risen, the chuck members C3 are inclined inward as shown in a left side portion of FIG. 5(c), in which state, a disk 1 is mounted on a surface of the cylinder S by fitting a center opening of the disk on a head H. When the shaft 2a is lowered, upper ends of the chuck members C3 are pushed by the head H to rotate them to a state shown in a right side portion of FIG. 5(c). Thus, the disk 1 is chucked by the chuck members C3 and the cylinder S as in the case shown in FIG. 5(b). This structure is advantageous in miniaturizing the chuck mechanism since a spring such as the spring Sp is unnecessary.

The structures shown in FIGS. 5(a)–5(c), however, have a defect that, when a rotation speed of the disk 1 increases, pressing force of the chuck members C1–C3 becomes insufficient, causing the disk 1 to be unstable. FIG. 5(d) shows another structure in which the defect mentioned above is removed by using an air attractive force as well.

In FIG. 5(d), a peripheral surface 1a of a disk 1 is partially pressed by a plurality of chuck members C4 each having the shown configuration while drawing air from a plurality holes m provided in a lower portion of the head H in a direction shown by an arrow A so that a rear surface of the disk 1 is attracted down. Since, however, this structure requires the provision of the holes m and an evacuating structure, which make the structure itself complex, it is not suitable to accommodate to miniaturization of the chuck mechanism.

FIG. 5(e) shows another prior art structure in which a C shaped resilient ring r is mounted on a lower conical portion of a head H. When the head H is risen, a diameter of the resilient ring r is resiliently reduced. In such state, a disk 1 is mounted on a cylinder S and, by expanding the diameter of the resilient ring r by lowering the head H, a whole surface 1a of the disk 1 is pressed down. This type chuck mechanism can hold the disk more reliably than the partially pressing mechanism and is suitable for high speed rotation of the disk. Incidentally, this structure is one of the chuck mechanisms disclosed in U.S. Pat. No. 5,014,143.

FIG. 5(f) shows another prior art chuck mechanism in which a conical surface is formed on an inner wall of a cylinder S and a plurality of chuck bars C5 are supported pivotally by pins provided on the inner wall of the cylinder. The chuck bars C5 are inclined outward by a pressure plate 2c formed in an upper portion of a shaft 2a to partially press a side surface of a center opening of a disk. In this system, there is no mechanism provided above the disk 1. Therefore, this structure is used as a chuck mechanism suitable for a magnetic characteristics tester of magnetic disk. However, when a rotation speed of the disk 1 increases, the disk holding force may become insufficient and so this system is not suitable for a usual disk tester.

The various prior art chuck mechanisms mentioned above, except that shown in FIG. 5(f), the surface 1a of the disk 1 is partially or wholly pressed down.

It is the current tendency that a disk is reduced in both diameter and thickness and a rotation speed thereof is increased. Therefore, when any of the prior art chuck mechanisms is used to hold such disk, the latter tends to be deformed. Particularly, for a compact disk rotating at high speed, detrimental vibration may occur in the disk due to possible eccentricity thereof with respect to a spindle.

SUMMARY OF THE INVENTION

An object of the present invention is to provide a disk chuck mechanism which is suitable to chuck a disk having a small diameter and is capable of stably chucking the disk even when it is rotated at high speed.

In order to achieve this object, the disk chuck mechanism according to the present invention is characterized by comprising a cylinder having a circular groove provided in a peripheral portion of a disk receiving top end surface of the cylinder and having a diameter substantially equal to or slightly larger than an inner diameter of the disk and a conical boss portion provided inside the circular groove and a through-hole provided in a center portion of the cylinder, a rod penetrating the through-hole and slidable therealong, a circular plate provided in an upper end of the rod or a front end of it, which protrudes on the side of the conical boss portion and having a diameter corresponding to the inner diameter of the disk, a plate member provided in an opposite end portion of the rod to the circular plate, a partially discontinuous resilient ring member provided between the circular plate and the conical boss portion and having a diameter smaller than the diameter of the circular groove and a biasing member mounted between the plate member and either a lower portion of the cylinder or a rear portion of it for biasing the rod in a direction away from either a lower portion of the cylinder or a rear portion of it, wherein the ring member has a inclined surface abutting to the conical boss portion and chucks the disk by pushing a side surface of the center opening of the disk with its side surface when it fits in the circular groove by a downward movement of the rod from the cylinder by the biasing member.

As mentioned, according to the present invention, the rod which is short and penetrates the cylinder is provided, the circular plate and a plate member are provided on the opposite ends of the rod, respectively, the biasing member such as a coil spring for biasing the rode in the direction in which the rod is moved away from the cylinder is provided in the lower side of the cylinder or rear side of it to push the rod away from the cylinder to thereby expand the ring member having the diameter smaller than the diameter of the circular groove and fit it therein. In this case, an outer peripheral surface of the ring member presses the side surface of the center opening of the disk uniformly. As a result, the disk is reliably chucked on the upper end surface of the cylinder.

When the plate member is pushed up, the coil spring as the biasing member is compressed and the rode is risen by the compression force of the expanded ring member. Therefore, the chucked disk is released.

The chucking and releasing of the disk can be performed easily by a vertical movement of the rod while the contraction force of the ring member and the biasing force of the biasing member are balanced. Therefore, the rod can move vertically while the various parts are held integrally by cooperating actions of the biasing force of the biasing member and the contraction force of the ring member. As a result, the disk chucking operation and the disk releasing operation are stable.

Since a mechanism for receiving the disk is to merely transmit the biasing force of the biasing member to the ring member, the mechanism can be constructed with only the single circular plate. Further, the rod is long enough to pass through the cylinder. Therefore, the moving portion of the present chuck mechanism can be made compact and light weight. Further, since the cylinder includes merely the conical boss portion in the front portion thereof and the biasing member in the rear portion thereof, it is possible to reduce the diameter of the cylinder.

Thus, it is possible to realize the compact disk chuck mechanism suitable for high speed rotation of the disk.

Particularly, the chucking operation and releasing operation of the disk can be performed more easily by providing a diaphragm in the lower portion of the cylinder and a circular plate for receiving the expansion force of the coil spring as the biasing member and pushing the circular plate up through the diaphragm by air.

Since, in this disk chuck mechanism, the whole side surface of the center opening of the disk is pressed by the outer peripheral surface of the ring member, deformation and/or positional displacement of the disk, which are usual gin the conventional mechanism in which the surface of the disk is pressed, hardly occur even when the thickness of the disk is reduced. Further, the structure is advantageously simple and compact. Further, when a diaphragm is warped to drive the mechanism by using air as a driving source for performing the chucking operation, the use of an air cylinder becomes unnecessary.

BRIEF DESCRIPTION OF THE DRAWINGS

FIG. 2 is a cross section of the disk chuck mechanism shown in FIG. 1, in which a left side portion thereof shows a disk chuck state and a right side portion thereof shows a disk release state;

FIGS. 5(a) to 5(f) show prior art disk chuck mechanisms in which FIG. 5(a) is a perspective view of the prior art chuck mechanism, FIGS. 5(b) to 5(f) are cross sections of other prior art chuck mechanisms in which left side portions of FIGS. 5(b), 5(c) and 5(f) show disk chuck states and right portions thereof shows disk release states, respectively, and FIG. 5(d) shows only a left side portion of the mechanism.

DESCRIPTION OF THE PREFERRED EMBODIMENTS

Figure 1:
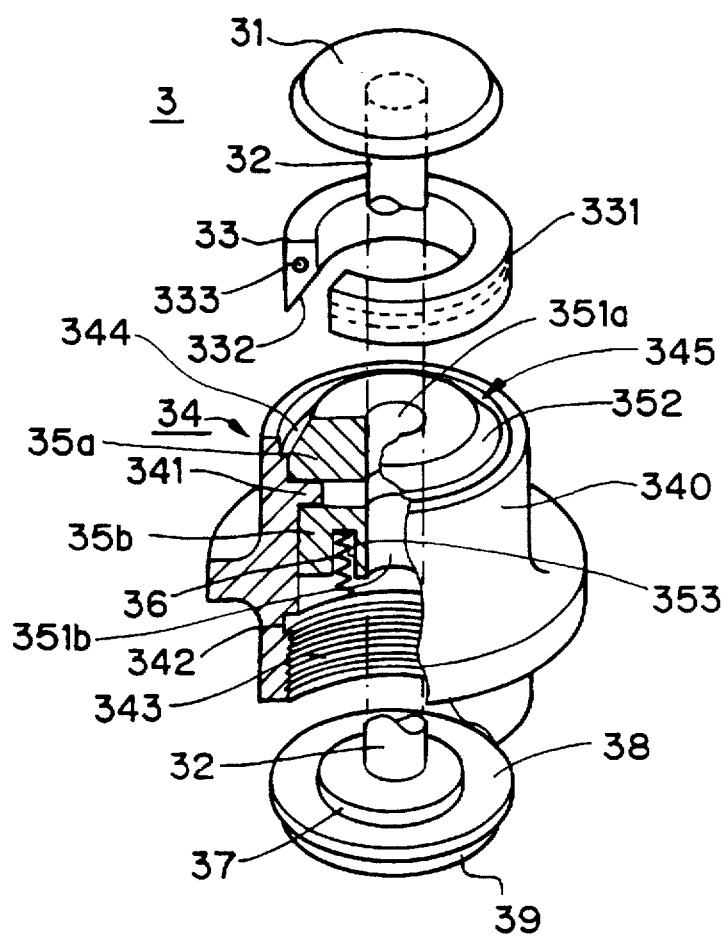
FIG. 1 is a disassembled perspective view of an embodiment of a disk chuck mechanism to which the present invention is applied.

In FIG. 1, a disk chuck mechanism 3 according to an embodiment of the present invention comprises a head circular plate 31, a connecting rod 32, a resilient chuck ring 33 having a portion thereof cut away, a cylinder 34, a coil spring 36, a pressing circular plate 37, a diaphragm 38 and an abutting ring 39.

The cylinder 34 comprises a hollow cylinder body 340, a flange portion 341 protruding from an inner wall of the cylinder body 340, an upper circular plate 35a provided in the hollow portion of the cylinder body and coupled to the flange portion 341 and a lower circular plate 35b provided in the hollow portion and coupled to an opposite side of the flange portion 341 to the upper circular plate 35a. An outer configuration of the abutting ring 39 corresponds to an inner diameter of the cylinder body 340 and has a role to uniformly hold the diaphragm 38.

The upper and lower circular plates 35a and 35b have center through-holes 351a and 351b into which the connecting rod 32 is inserted. A boss 352 is provided on the upper circular plate 35a. The boss 352 takes in the form of a frustum of a cone and will be referred to as conical boss hereinafter. That is, the upper circular plate 35a has a center through-hole 351a into which the connecting rod 32 is inserted and has a frustum of a cone on in an upper portion thereof, whose slope surface receives the chuck ring 33, as the boss 352. The lower circular plate 35b supports the head circular plate 31, the connecting rod 32 and the chuck ring 33 vertically movably in the cylinder body 34 through the flange portion 341. A plurality of blind holes for receiving compressed coil springs 36 are provided in a sole surface of the lower circular plate 35b point-symmetrically or along a periphery thereof at a predetermined interval (see FIG. 2).

Figure 3A:
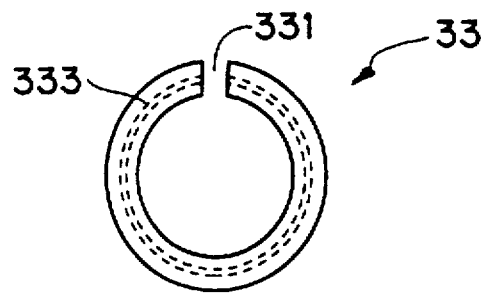
FIGS. 3(a), 3(b) and 3(c) are a plan view of a chuck ring, a perspective view of a connecting rod and a plan view of a stop ring, respectively.
Figure 3B:
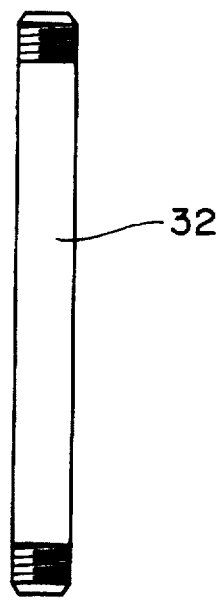

The connecting rod 32 has in opposite end portion thereof male threads as shown in FIG. 3(b), which are threaded into female threads (not shown) formed in the center portions of the head circular plate 31 and the pressing plate 37, respectively. The connecting rod 32 passes through a center of the chuck ring 33 arranged between the head circular plate 31 and the pressing circular plate 37, inserted into the through-hole 351a of the conical boss 35 and passes through the through-hole 351b of the lower circular plate 35b.

The cylinder body 340 has a stepped portion 344 in a peripheral portion of the upper end surface which is adapted to receive the disk 1 (see FIG. 2). The stepped portion 344 forms, together with the side surface of the conical boss 35a, a circular groove 345 having a diameter substantially equal to or slightly larger than the inner diameter of the disk 1. Further, a flange portion 341 protrudes inward from an inner wall of the stepped portion 344. An annular groove 342 is formed in the inner surface of the lower portion of the cylinder body 340, in which the diaphragm 38 is fitted, and an annular thread 343 is formed below the annular groove 342, into which the upper end portion of the spindle 2 is screwed. The diaphragm 38 mounted in the annular groove 342 is of rubber.

FIG. 3(a) is a plan view of the chuck ring 33 as an example of the ring member of the present invention. The chuck ring 33 is of soft nylon or resilient resin material and has a C shaped ring 333 of steel embedded therein. A portion 331 of the chuck ring 33 is cut away. A cross section of the chuck ring 33 is defined by a flat upper side, a vertical inner peripheral side, a vertical outer peripheral surface 331 and an inward tapered lower side 332. The inclination of the lower side surface 332 corresponds to that of the conical surface of the base portion 352 of the conical boss 35a. An outer diameter of the chuck ring 33 is smaller than that of the circular groove 345 formed in the cylinder body 340.

An assembling of the disk chuck mechanism 3 composed of these parts mentioned above is started by a screwing of the upper end portion of the connecting rod 32 into the circular head plate 31. Then, the connecting rod 32 is inserted into the chuck ring 33 and then into the through-hole 351a of the conical boss 35a until the lower surface 332 of the chuck ring 33 fits on the inclined surface of the boss portion 352 of the conical boss 35a. Thereafter, the assembly of the circular head plate 31, the connecting rod 32, the chuck ring 33 and the conical boss 35 is inserted down into the cylinder body 340 with the conical boss 35a being received on the flange portion 341 of the cylinder body 340.

Thereafter, the cylinder body 340 is turned over while the circular head plate 31 is held in its position. Then, the lower circular plate 35b is fitted in the cylinder body 340 with the through-hole 351b thereof being fitted on the connecting rod 32. Then, the coil springs 36 are inserted into the holes 353 provided in the lower surface of the lower circular plate 35b. Thereafter, the circular pressing plate 37 is screwed onto the lower end portion of the connecting rode 32. In this state, the coil springs 36 are compressed by the circular pressing plate 37. The coil spring 36 in expanded state is longer than depth of the hole 353 and, in this embodiment, is about twice the depth of the hole 353. Expansion force of the compressed coil springs 36 is larger than pulling-up force of the connecting rod 32 due to contraction of the chuck ring 33. However, expansion of the compressed coil springs 36 is limited by the length of the connecting rod 32. Describing this with reference to the cylinder body 340 turned over again, the connecting rod 32 is not pulled out from the cylinder body 340 beyond an extent shown in the right side portion of FIG. 2 even when the coil springs 36 expand, because the chuck ring 33 engages with the annular groove 345. The length of the connecting rod 32 is selected such that position of the circular pressing plate 37 in this case substantially corresponds to a position of an upper edge of the annular groove 342.

Then, the diaphragm 38 is put on the circular pressing plate 37 and fixed in the cylinder body 340 by deforming the peripheral portion of the diaphragm 38 and inserting the peripheral portion into the annular groove 342. Then, the spindle 2 is fixed by screwing the upper end portion of the spindle 2 into the thread 343 of the cylinder 34. The coupling of the spindle 2 and the cylinder 34 may be performed in other ways. For example, the coupling can be made by fitting the upper end portion of the spindle 2 in the lower end of the cylinder 34 and fixing then by using another key screw.

The disk chuck mechanism 3 thus assembled becomes as shown in the right side portion of FIG. 2. That is, when the circular pressing plate 37 and the circular head plate 31 are coupled by the connecting rod 32 with the coil springs 36 being compressed, the coil springs 36 expand with respect to the flange portion 341 coupled thereto through the lower circular plate 35b to lower the connecting rod 32.

Therefore, the connecting rod 32 is pushed down from the lower circular plate 35b to expand the diameter of the chuck ring 33 by the conical boss to thereby lower the chuck ring 33 up to the position of the annular groove 345. At this time, the movement of the connecting rod 32 is stopped since there is no further lowering of the connecting rod 32 from the lower circular plate 35b. Thus, the state shown in the right side portion of FIG. 2 is established in which the connecting rod 32, the chuck ring 33, the upper circular plate 35a and the lower circular plate 35b are made integral with the cylinder body 340.

Now, a chucking operation of this disk chuck mechanism 3 will be described. In FIG. 2, air A is supplied from an air pump 40 through an opened valve 41 and the through-hole 2b of the spindle 2 to the disk chuck mechanism 3, upon which the diaphragm 38 is warped upward as shown in the left side portion of FIG. 2. Thus, the circular pressing plate 37 is pushed upward against expansion force of the coil springs 36 and the circular head plate 31 and the chuck ring 33 are pushed upward.

The conical surface 332 of the chuck ring 33 thus pushed up is moved upward along the conical surface 352 of the conical boss 35a while reducing the diameter of the chuck ring 33 due to contraction force thereof. In this state, the disk 1 taken up by a robot hand is put on the outer peripheral surface of the annular groove 350 of the cylinder body 340 by aligning the center opening of the disk 1 with the circular head plate 31.

Since expansion force of the compressed coil springs 36 is larger than contraction force of the chuck ring 33 for pushing up the connecting rod 32, the vertical movement of the connecting rod 32 is stable. In this case, the chuck ring 33 moves vertically and laterally along the inclined surface of the conical boss 35a stably by its own contraction force.

When the supply of air A is stopped in this state, the diaphragm 38 recovers to the state shown in the right side portion of FIG. 2. Therefore, the chuck ring 33 and the circular pressing plate 37 are lowered while the diameter of the chuck ring 33 is expanded. Thus, the outer peripheral surface of the chuck ring 33 uniformly pushes the peripheral side surface 1b of the center opening of the disk 1. Therefore, the disk 1 is held reliably since the position of the disk 1 is not displaced with respect to the upper end surface of the cylinder body 340 and there is substantially no deformation of the disk.

Figure 3C:
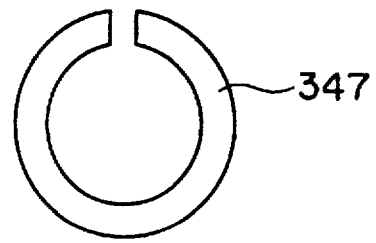
Figure 4:
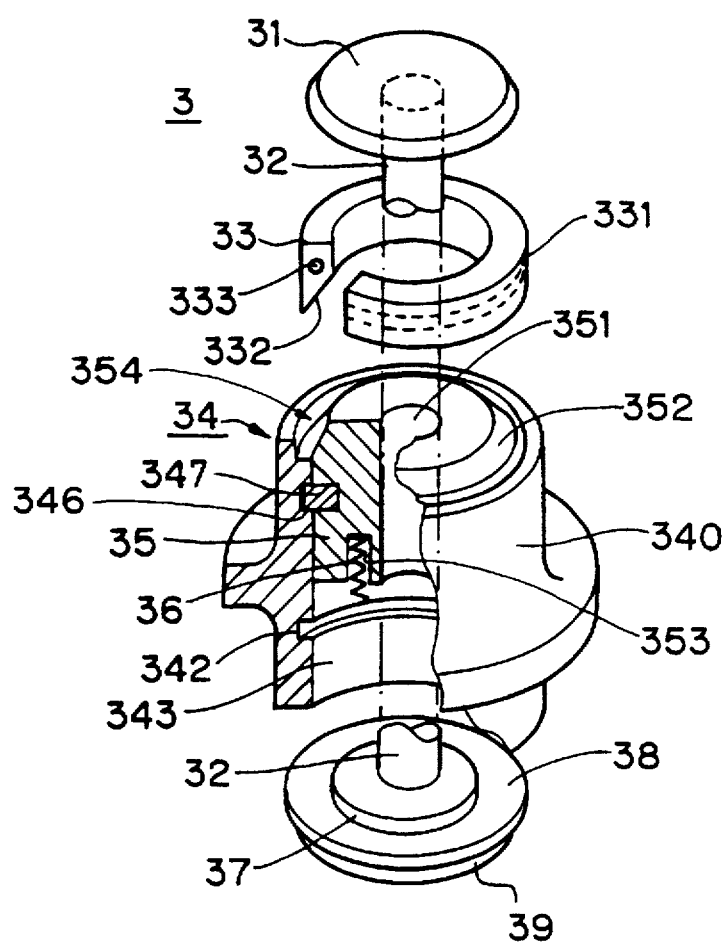
FIG. 4 is a disassembled perspective view of another embodiment of a disk chuck mechanism to which the present invention is applied.

FIG. 4 shows another embodiment of the present invention, in which the conical boss 35a (upper circular plate 35a) and the lower circular plate 35b in FIG. 1 are provided integrally as a cylinder member 35. In FIG. 4, the cylinder member 35 is arranged in the cylinder body 340 by a partially cut away, resilient stop ring 347 fitted between a groove 346 provided in lieu of the flange portion 341 of the cylinder body 340 and a groove 354 provided in the cylinder member 35 oppositely to the groove 346. The resilient stop ring 347 is shown in FIG. 3(c). Length of the cylinder member 35 is smaller than that of the cylinder body 340. Therefore, the lower end portion of the cylinder member 35 is located within the cylinder body 340.

In assembling this embodiment, the stop spring 347 is fitted in the groove 354 of the cylinder member 35. When the assembly is assembled to the cylinder body 340, the stop ring 347 is resiliently deformed and fits in the groove 346 of the cylinder body 340. The stop ring 347 may be of hard rubber or spring material.

Alternatively, it may be possible to assemble the mechanism by preliminarily fixing the stop ring 347 to the cylinder body 340 by adhesive, etc., and then mounting the cylinder member 35 using the groove 354.

As mentioned, in the embodiment shown in FIG. 1, the conical boss 35a, the lower circular plate 35b and the cylinder body 340 are prepared separately and assembled. Further, in the embodiment shown in FIG. 4, the cylinder body 340 and the cylinder member 35 are assembled by using the stop ring 347. In both of the embodiments shown in FIGS. 1 and 4, the cylinder 34 is of stainless steel. Further, in view of manufacturing and maintenance works, the cylinder 34 is constructed by assembling the separately prepared parts. Although the cylinder 34 can be constituted with the metal parts, it may be, of course, possible to form the assembly of the cylinder member 35 and the cylinder body 340 as a single member by a resin mold.

Further, although, in the described embodiments, the circular pressing plate 37 and the circular head plate 31 are assembled by screwing them to the opposite end portions of the connecting rod 32, they may be assembled by using suitable adhesive. Particularly, one of the circular pressing plate 37 and the circular head plate 31 may be preliminarily assembled with the connecting rod.

Although, in the described embodiments, the coil springs are used as the biasing means for pushing the connecting rod, the biasing means may be a leaf spring or springs. Further, the biasing means may be any so long as it biases the connecting rod in the direction in which the connecting rod is pushed away from the lower portion of the cylinder.

Further, in the described embodiments, the connecting rod is pushed upward against the coil springs by using the diaphragm, the driving source for driving the connecting rod vertically is not limited to the combination of the diaphragm and air.

Further, in the described embodiments, the pressing plate 37 is made circular in order to receive the driving force from the diaphragm, it is not always circular when air force is not used for the vertical movement of the connecting rod. The pressing plate may be any so long as it is coupled to the lower end portion of the connecting rod and engaged with the springs.

In the described embodiments, when the disk chuck mechanism is provided on a horizontal line, the upper end of the cylinder becomes a front end of it and the lower end of it becomes a rear end of it.

What is claimed is:

1. A disk chuck mechanism comprising:
   a cylinder having an annular groove provided in a peripheral portion of a disk receiving upper surface of said cylinder and having a diameter substantially equal to or slightly larger than an inner diameter of said disk and a conical boss portion provided inside said annular groove and a through-hole provided in a center portion of said cylinder;
   a rod penetrating said through-hole and slidable therealong;
   a circular plate provided in either an upper end of said rod or a front end of it, said circular plate protruding on the side of said conical boss portion and having a diameter corresponding to the inner diameter of said disk;
   a plate member provided in an opposite end portion of said rod to said circular plate;
   a partially discontinuous resilient ring member provided between said circular plate and said conical boss portion and having a diameter smaller than the diameter of said annular groove; and
   a biasing member mounted between said plate member and either a lower portion of said cylinder or a rear portion of it for biasing said rod in a direction away from a rear portion of said cylinder, wherein said ring member has a inclined surface abutting to said conical boss portion and chucks said disk by pushing a side surface of said center opening of said disk with its side surface when it fits in said annular groove by a downward movement of said rod from said cylinder by said biasing member.

2. A disk chuck mechanism as claimed in claim 1, wherein said circular groove is formed together with the side surface of said conical boss portion.

3. A disk chuck mechanism as claimed in claim 2, wherein said ring member is a resin ring having a steel ring embedded therein, said biasing means is coil springs, said cylinder has a plurality of blind holes formed in a sole surface thereof for receiving said coil springs and an expansion force of said coil springs in a compressed state is larger than a pulling back force generated by contraction of said ring member, for pulling back said rod.

4. A disk chuck mechanism as claimed in claim 3, further comprising a diaphragm and wherein said plate member is circular and said diaphragm is provided behind said plate member and pushes up said plate member to pull back said rod to said cylinder to thereby pull said ring member inside from said annular groove when air pressure is applied.

5. A disk chuck mechanism as claimed in claim 4, wherein said cylinder comprises a hollow cylinder body and a cylinder member having a length shorter than that of said cylinder and integrally mounted in said cylinder body, said annular groove is formed by a stepped portion provided in a peripheral portion of said cylinder body and said cylinder member, said conical protrusion is provided on an upper end portion of said cylinder member and the plurality of said holes for receiving said coil springs are formed in a lower end portion of said cylinder member.

6. A disk chuck mechanism as claimed in claim 2, wherein said cylinder comprises a hollow cylinder body, a flange portion protruding inward from an inner wall of said cylinder body, an upper circular plate provided in said hollow portion of said cylinder body and engaging with said flange portion and a lower circular plate provided in said hollow portion of said cylinder body and engaging with said flange portion on an opposite side to said upper circular plate.

7. A disk chuck mechanism as claimed in claim 6, wherein said annular groove is formed by a stepped portion provided in a peripheral portion of said cylinder body and said upper circular plate, said conical protrusion is provided on an upper end portion of said upper circular plate and the plurality of said holes for receiving said coil springs are formed in a sole portion of said lower circular plate.

8. A disk chuck mechanism as claimed in claim 7, further comprising a diaphragm and wherein said plate member is circular and said diaphragm is provided behind said plate member and pushes up said plate member to pull back said rod to said cylinder to thereby pull said ring member inside from said annular groove when air pressure is applied.

9. A disk chuck mechanism as claimed in claim 8, wherein an upper end portion of a spindle is coupled to said cylinder below said diaphragm.

10. A disk chuck mechanism as claimed in claim 9, wherein said spindle has a through-hole for supplying air and is coupled to said cylinder through a ring having diameter corresponding to an inner diameter of said cylinder body.

* * * * *